United States Patent Office 3,827,870
Patented Aug. 6, 1974

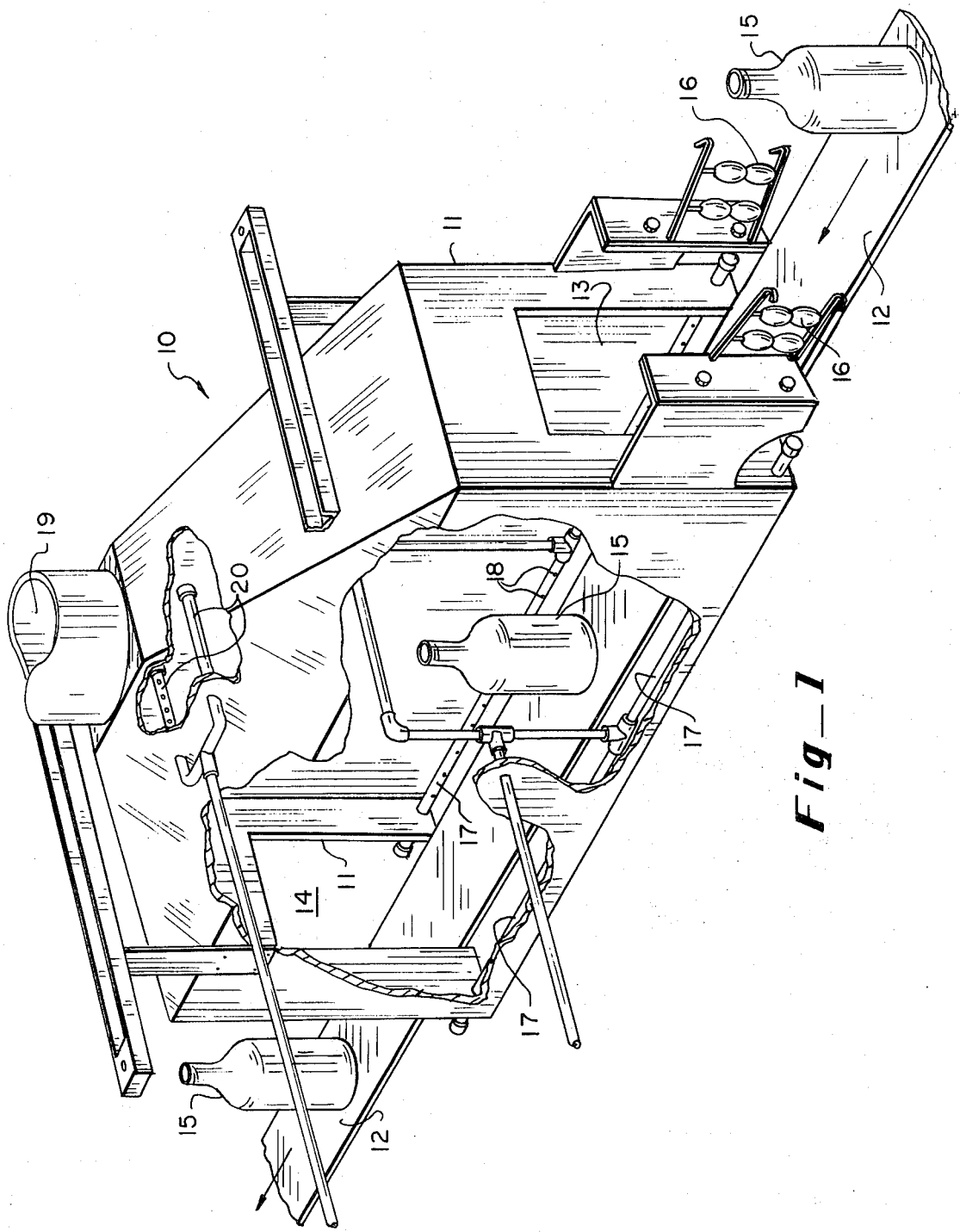

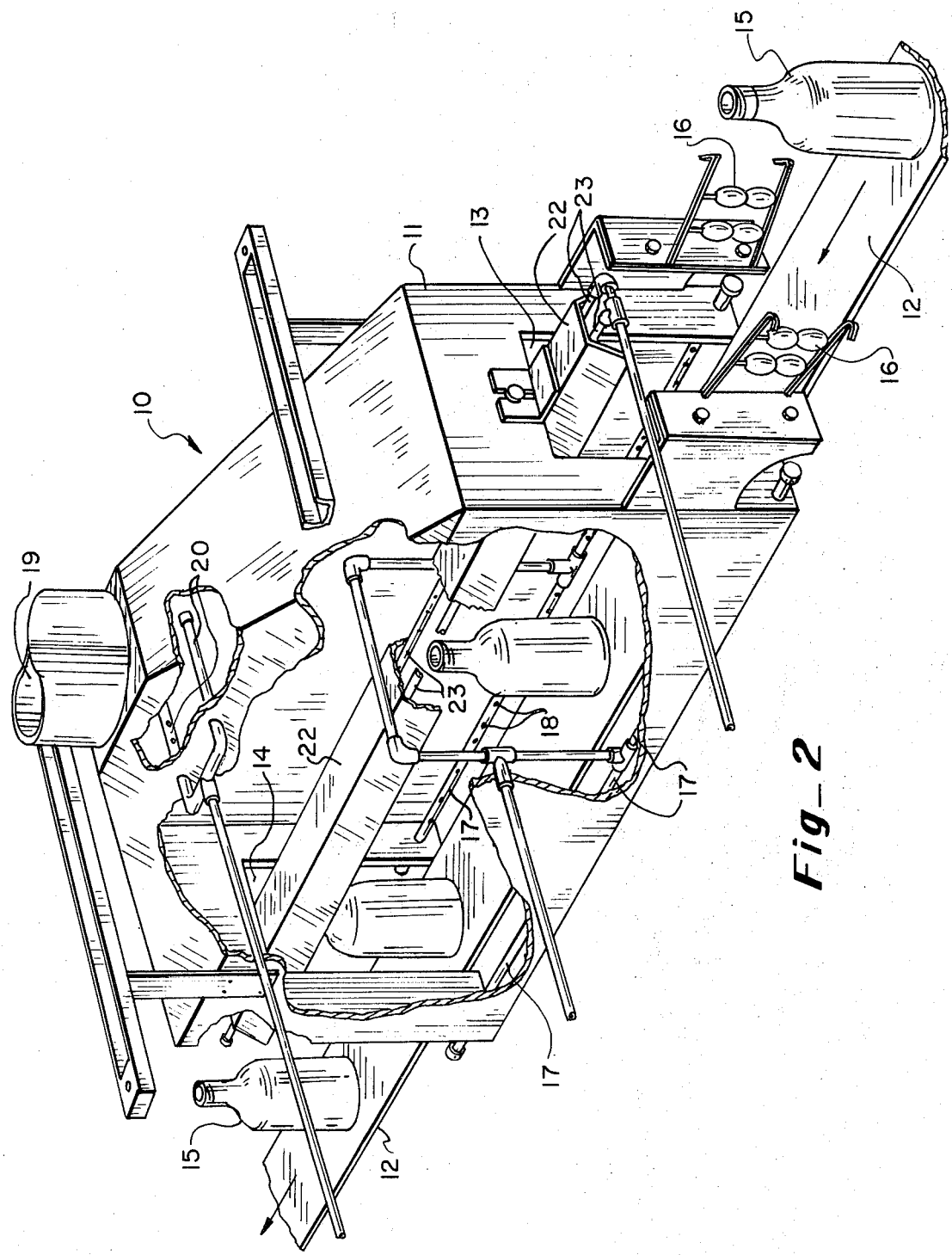
Fig_2

3,827,870
METHOD AND APPARATUS FOR COATING GLASSWARE
Clement V. Fogelberg and John M. Kujava, Arvada, Colo., assignors to Columbine Glass Company, Wheat Ridge, Colo.
Filed June 25, 1973, Ser. No. 373,325
Int. Cl. C03c 17/10
U.S. Cl. 65—60                               11 Claims

ABSTRACT OF THE DISCLOSURE

This invention pertains to a method and apparatus for "hot-end" treating and coating of newly formed glassware surfaces by exposing such surfaces to hydrolyzable and pyrolytically degradable metallic halide treatment gases wherein, as the result of the corosive waste products produced by hydrolyzation and degradation of such gases, a flame is utilized to induce flow of such waste products through a duct to a proper disposal area. The improvement in the method and apparatus being, contrary to the prior art and accepted commercial embodiments, the location of the flame at an area remote from the treatment portion of such hooded apparatus whereby improved, smoother and more tenacious coating of the glass is produced.

BACKGROUND OF THE INVENTION

(1) Field of the Invention

The present invention relates generally to hot-end glassware coating apparatus and methods and more particularly to a hot-end glassware coating apparatus and method wherein burners are utilized to accomplish venting of the apparatus and to avoid deposits in the device.

(2) Description of the Prior Art

Use of metal halides such as stannous chloride, stannic chloride, titanium tetrachloride, etc., are well-known and widely accepted as "hot-end" coating compounds for glassware. A broad example of apparatus and method to accomplish this process is to be found in U.S. Letters Patent 3,561,940 issued Feb. 9, 1971, to Addison B. Scholes. Another example of somewhat different apparatus and method for accomplishing the process is disclosed in U.S. Letters Patent 3,516,811 issued June 23, 1970, to George L. Gatchet. In both of these examples, newly formed glassware at temperatures above the pyrolytical decomposition temperatures of the metallic halides are exposed to vapors of the metallic halide treatment gas to form a metallic oxide protective coating on the glass ware. Since the treatment gases are highly hydroscopic and, when exposed to moisture, hydrolyzed to form objectionable deposits and products, i.e., hydrochloric acid, which are detrimental both to equipment and to the coating, dry air is utilized as a carrying medium for the treatment gas. Such means as hooded enclosures and fast flowing laminar streams of coating gas are utilized to minimize contact of the treatment gas with moisture.

In many cases, it is desirable to avoid coating the finish portion of the glassware with the metallic oxide since some minor electrical conductivity and possible electrolytic action between the glassware contents and a metal closure may result. In the case of flame polishing of the finish portion of the glassware, discoloration can occur. Commonly, the finish portion of the bottle is allowed to project from the enclosure hood or a laminar flow is directed over other than the finish portion of the bottle. The above-specified patents discuss embodiments of such provisions.

Since the treatment gas necessarily comes in contact with moisture when enclosed in the hood as a result of openings in the hood for entrance and exit of glassware moving therethrough, and since the products of hydrolysis are highly objectionable, efforts have been made to exhaust the excess treatment gas and decomposition products thereof from the working area. However, since the decomposition products are also highly corrosive, the use of normal blowers and other exhaust means have been entirely unsatisfactory. White, corrosive deposits formed in the hood and exhaust means greatly shortened the life of both.

There is currently on the market and in commercial use a highly advanced hot-end coating hood which utilizes gas burners at the bottom of the coating hood to induce a draft up the exhaust duct. Since the hydrolysis reaction is an exothermic reaction and, at the temperature induced by the burners, no white deposits are formed, it was generally accepted that the probelms of hydrolysis are avoided by use of such burners. Accordingly, the gas burners are located in the bottom of the commercially available apparatus to direct and induce flow of the treatment gas and excess and pyrolytic decomposition products thereof towards and over glassware and then through the exhaust ducts.

SUMMARY OF THE INVENTION

The present invention, which provides a heretofore unrecognized and unavailable improvement over previous methods and apparatus for coating glassware, utilizes the desirable gas burner for heating the hood and exhaust of excess treatment gas and waste products therefrom, but by locating the gas burners at a critical location remote from and downstream of the volume in which the treatment gas contacts the glassware. A marked improvement in the quality of the metallic oxide coating has been observed. Surprisingly, it has been found that, despite maintaining the temperature above the temperature at which hydrolysis of the metallic halide treatment gas composition occurs, nevertheless a detrimental effect has been noted as a result of the prior location of the gas burner in the treatment area. The mechanism of this detrimental effect is not known, but it is expected that water resulting from combustion of hydrocarbon gases somehow deleteriously effects the coating despite the maintainance of temperatures above that at which the white deposits usually associated with hydrolysis occur.

Accordingly, an object of the present invention is to provide a new and improved method and apparatus for providing a superior coating of metal oxide on glassware.

Another object of the present invention is to provide a method and apparatus utilizing a desirable gas burner exhaust means which, through critical location of the burners, does not adversely affect the metallic oxide coating on the glassware.

Yet another object of the present invention is to provide a method and apparatus which may be optionally employed in conjunction with the critically placed gas burner exhaust means to prevent formation of metallic oxide coating on the finish portion of the glassware.

These and other objects and features of the present invention will be apparent from the following description.

BRIEF DESCRIPTION OF THE DRAWINGS

In the drawings:

FIG. 1 is a partial cutaway perspective view of the coating apparatus of the instant invention; and FIG. 2 is a partial cutaway perspective view of the coating hood of the present invention utilizing an optional internal means for precluding coating of the finish portion of glassware.

DETAILED DESCRIPTION OF THE INVENTION

Turning now to the drawings, wherein like components are designated by like reference numerals throughout the various figures, a coating apparatus for treating and forming on glassware a protective metallic oxide coating is illustrated in FIG. 1 and generally designated by the reference numeral 10. The device generally includes a hood 11 suspended over and around a conveyor 12, which is preferably foraminous and carries glassware 15. Entrance and exit openings 13 and 14 are defined in end portions of hood 11. Side rollers 16 are positioned adjacent entrance 13 to insure that glassware 15, which happens to be slightly misplaced on conveyor 12, will be accurately conducted into entrance 13. Conduit 17 having a number of openings 18 defined therein is disposed along the bottom of hood 11 adjacent conveyor 12. Treatment gas carried in dry air is thus provided to the interior of hood 11 and directed at glassware 15 being conveyed through hood 11 on conveyor 12.

An exhaust duct 19 is disposed at the upper portion of hood 11 and in communication with the interior of hood 11. One or more gas burners 20 are located in the upper portion of hood 11 adjacent exhaust duct 19. From this, it will be appreciated that treatment gas entering the hood through openings 18 in conduit 17 would first contact and leave glassware 15 being carried on conveyor 12 before coming in contact with the flame from gas burners 20. Further, gas burners 20, being adjacent exhaust duct 19, maintains the decomposition products of the treatment gas at a higher temperature while inducing flow through exhaust hood 19 where the temperature tends to be lower as a result of heat losses. Concurrently, heat radiating from the flames of burners 20 maintains the internal temperature of hood 11 at a desired high level.

As suggested by the prior art, decomposition products and treatment gas maintained above a critical temperature do not hydrolyze and form corrosive white coatings on the equipment. However as a result of the lack of hydrolyzation at such temperatures, it has heretofore been unrecognized that adverse effects upon the coating can result from gas flames even though the hydrolyzation products are not seen to be present in their usual form. A marked improvement in the quality coating resulted from moving the flame burners 20 from the conventional, supposedly superior position adjacent conduit 17 to that shown in the drawings.

A second optional embodiment, as shown in FIG. 2, utilizes a downward-facing shield 22 disposed centrally within hood 11. Dry air is provided to shield 22 by duct 23. Accordingly, when glassware 15 is carried through hood 11 on conveyor 12, the finish portion of the glassware is positioned within shield 22 which is flooded with an inert, i.e., noncoating, gas preferably dry air. The dry air flows into the volume defined by shield 22 and then into the flow of excess treatment gas towards exhaust duct 19 without deluting the treatment gas in the critical area lower in hood 11. Since the pressure is higher in shield 22 and consists entirely of dry air, the finish portion of the glassware 15 passing through the volume is effectively protected from contact with the treatment gas.

Summarily, the present invention involves a method and apparatus resulting from the recognition that conventional apparatus which employs gas flame burners disposed at the bottom of the treatment hood is recognized as causing adverse effects in the coating of glassware. Recognition of this problem is rather unexpected in that, as the prior art predicted, the flames did preclude the usual visible deleterious effect of hydrolysis and protected the apparatus from corrosive deposits of the hydrolysis product. Accordingly, one skilled in the art would expect that, in the absence of the usual white deposits resulting from hydrolysis, the water vapor resulting from combustion of the gas was, in fact, innocuous in the treatment areas in that hydrolysis was not visible. Contrary to this most plausible assumption, less than optimum quality in the glassware coating was detected and, upon identifying the most obscure cause for this condition, rectified by relocating the gas burners to the upper portion of the hood without sacrificing any of the advantages accuring from the use of the gas burner.

Although only two embodiments of the present invention have been illustrated and described, it is anticipated that various changes and modifications will be apparent to those skilled in the art and that such changes may be made without departing from the scope of the invention, as defined by the following claims.

What is claimed is:

1. Apparatus for treating newly formed glassware, comprising: a hood having entrance and exit openings defined in opposite sides thereof and a duct defined in the top thereof, conveyor means for carrying glassware through the hood positioned at the bottom portion of the entrance and exit openings and through the bottom portion of the hood, conduit means secured at the bottom of the hood to conduct treatment gas into the hood and into contact with glassware carried on the conveyor means, and at least one gas burner located in the hood adjacent the duct and remote from the conveyor whereby the gas burner heats the interior of the hood to minimize corrosive deposits in the hood and promotes a positive draft to induce ventilation of the hood without permitting the gas burner combustion products to contact the glassware and adversely affect coatings formed thereon.

2. Apparatus as set forth in Claim 1 wherein the conveyor means comprise a foraminous belt.

3. Apparatus as set forth in Claim 1 wherein the conduit means comprise tubular members having small openings defined along the length thereof and facing toward the interior of the hood, at least one tubular member being mounted on each side of the conveyor means and parallel thereto.

4. Apparatus as set forth in Claim 1 wherein a downwardly-extending shield member is mounted within the hood and extends the length of the hood from a position adjacent the entrance opening to a position adjacent the exit opening, and means adapted to supply a flow of dry air to the bottom portion of the shield member, whereby the finish portion of glassware passing through the hood on the conveyor means extends into the dry air under the shield member and is protected from exposure to the treatment gas.

5. Improved apparatus for exposing newly formed glassware at an elevated temperature to metallic halide treatment gas, comprising: a foraminous belt conveyor for transporting glassware, an elongated hood having openings defined in each of the shorter two sides of the hood, the hood being mounted over the conveyor with each of the openings adjacent the conveyor, means adapted to conduct treatment gas to the interior of the hood, an exhaust duct defined in the top portion of the hood, and at least one burner mounted in the hood beneath the exhaust duct but remote from the conveyor.

6. Apparatus as set forth in Claim 5 wherein a downwardly-extending, three-sided shield member is mounted in the hood and extends at least from the top of one of the openings to the top of the other openings, and means provided for supplying an inert gas to the bottom side of the shield member.

7. A method of forming a metallic oxide coating on glassware, comprising: conveying glassware at an elevated temperature through a hood, supplying a pyrolytically decomposable treatment gas to the interior of the hood, decomposing the treatment gas by exposure to the hot glassware, forming a metallic oxide coating on the glassware from the decomposition products of the treatment gas, burning a combustible gas at a position within the hood above the glassware to create an upward draft to ventilate the hood, and carrying away the excess gases in the hood through a duct as a result of the burning of the combustible gas.

8. A method as set forth in Claim 7 wherein a non-coating gas is supplied to the underside of a downward-facing shield and the finish portion of the glassware is maintained in the non-coating gas while in the hood to prevent the formation of a coating thereon.

9. A method as set forth in Claim 7 wherein the treatment gas is a metallic halide.

10. A method as set forth in Claim 9 wherein the treatment gas is tin chloride.

11. A method as set forth in Claim 9 wherein the treatment gas is titanium tetrachloride.

References Cited

UNITED STATES PATENTS

| | | | |
|---|---|---|---|
| 3,561,940 | 2/1971 | Scholes | 65—60 |
| 3,615,327 | 10/1971 | McLary | 65—60 |
| 3,623,854 | 11/1971 | Frank | 65—60 X |
| 3,689,304 | 9/1972 | Bamford | 65—60 X |

ARTHUR D. KELLOGG, Primary Examiner

U.S. Cl. X.R.

117—105.3; 118—49.1, 49.5